United States Patent
Johnson et al.

(10) Patent No.: US 8,112,415 B1
(45) Date of Patent: Feb. 7, 2012

(54) OPTIMIZED FIELD UNPACKING FOR A DATA STREAM MANAGEMENT SYSTEM

(75) Inventors: Theodore Johnson, New York, NY (US); Lukasz Golab, Morris Plains, NJ (US); Oliver Spatscheck, Randolph, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 917 days.

(21) Appl. No.: 12/132,690

(22) Filed: Jun. 4, 2008

(51) Int. Cl.
*G06F 17/30* (2006.01)
*G06F 7/00* (2006.01)

(52) U.S. Cl. ......... 707/718; 707/719; 707/721; 707/758

(58) Field of Classification Search .................. None
See application file for complete search history.

(56) References Cited

U.S. PATENT DOCUMENTS

| | | | |
|---|---|---|---|
| 6,439,783 B1 * | 8/2002 | Antoshenkov | 1/1 |
| 7,165,100 B2 | 1/2007 | Cranor et al. | |
| 2005/0267877 A1 * | 12/2005 | Chaudhuri et al. | 707/3 |
| 2007/0162425 A1 * | 7/2007 | Betawadkar-Norwood et al. | 707/2 |
| 2008/0154818 A1 * | 6/2008 | Bowman | 706/17 |

* cited by examiner

*Primary Examiner* — Tim T Vo
*Assistant Examiner* — Sangwoo Ahn
(74) *Attorney, Agent, or Firm* — Hoffman & Baron, LLP

(57) ABSTRACT

Two methods and computer-readable medium for obtaining information using field group unpacking functions. The first method obtains information using field group unpacking functions by identifying an optimized unpacking function from field group unpacking functions, and an optimized unpacking function is used to unpack a field associated with the data stream. The second method obtains information using field group unpacking functions by identifying an optimized unpacking function from the field group unpacking functions. Then, a prefilter is applied and associated with the optimized unpacking functions and used to unpack a field associated with the data stream. The computer-readable medium obtains field group unpacking functions for execution by a computing device using field group unpacking functions that identify an optimized unpacking function from the field group unpacking functions, and use an optimized unpacking function to unpack a field associated with the data stream.

10 Claims, 7 Drawing Sheets

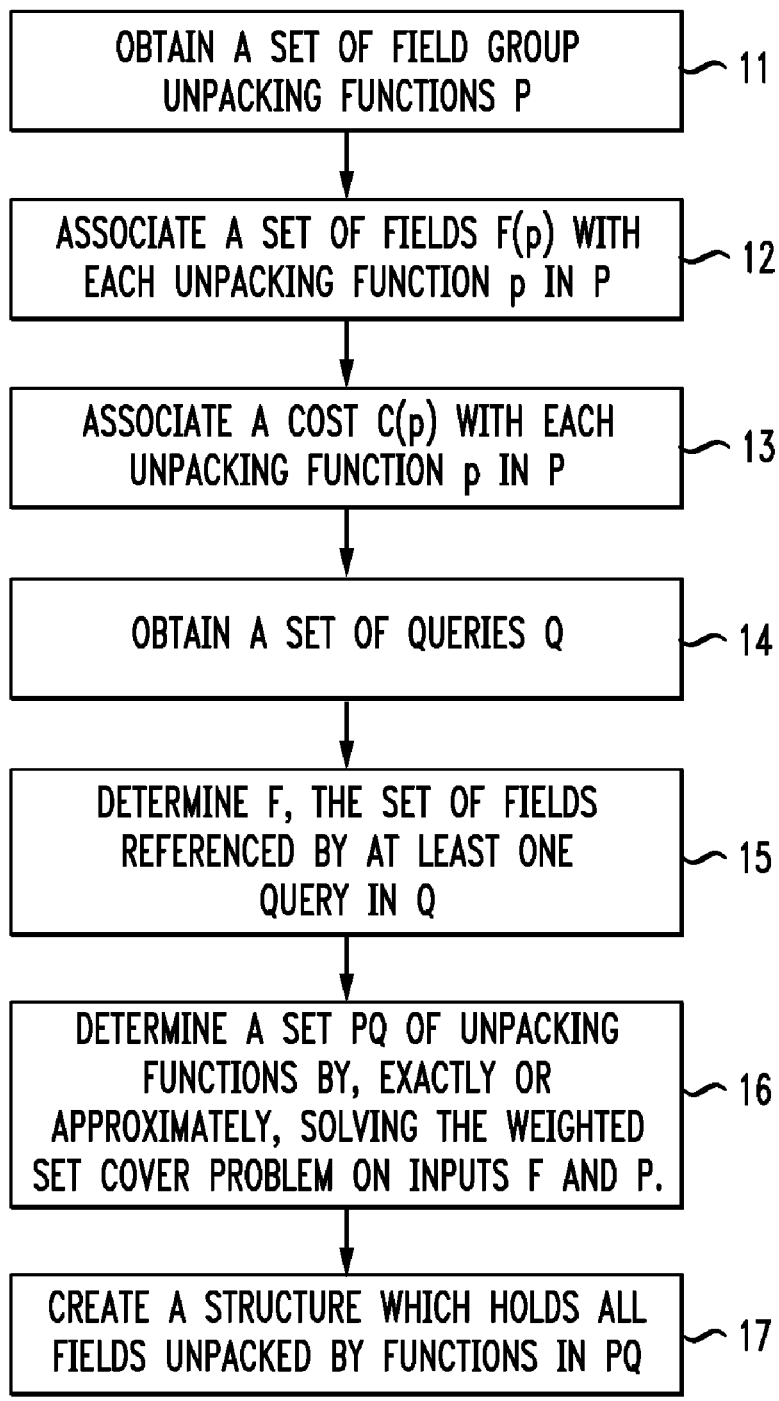

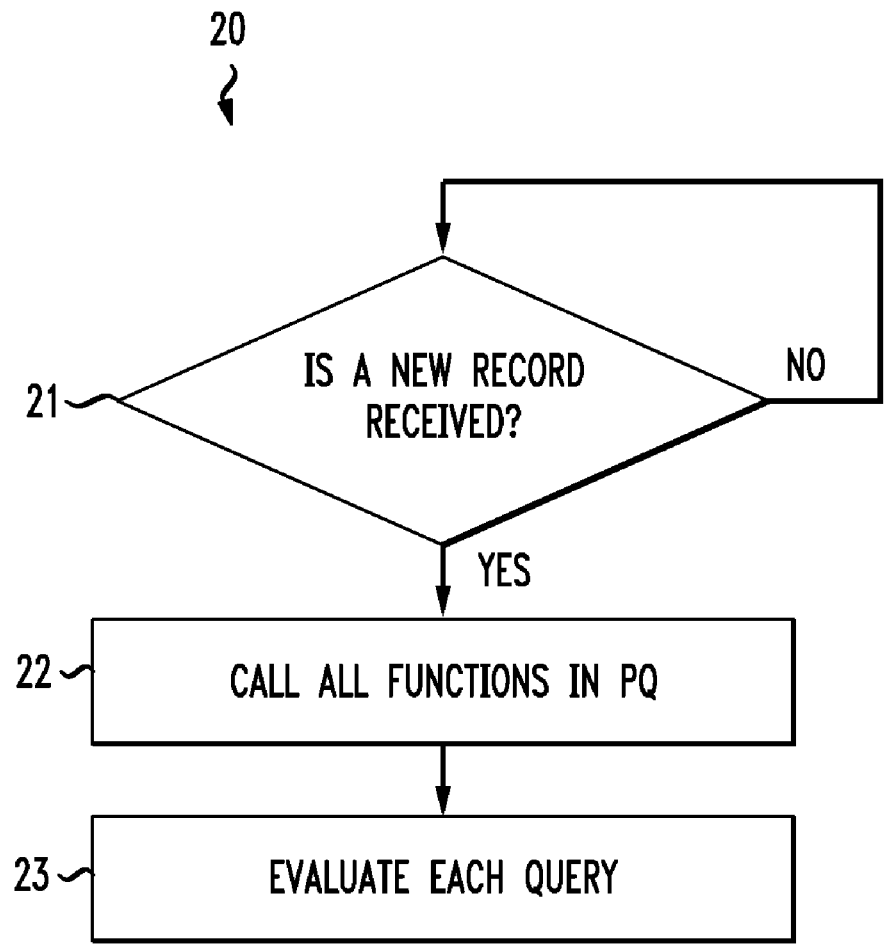

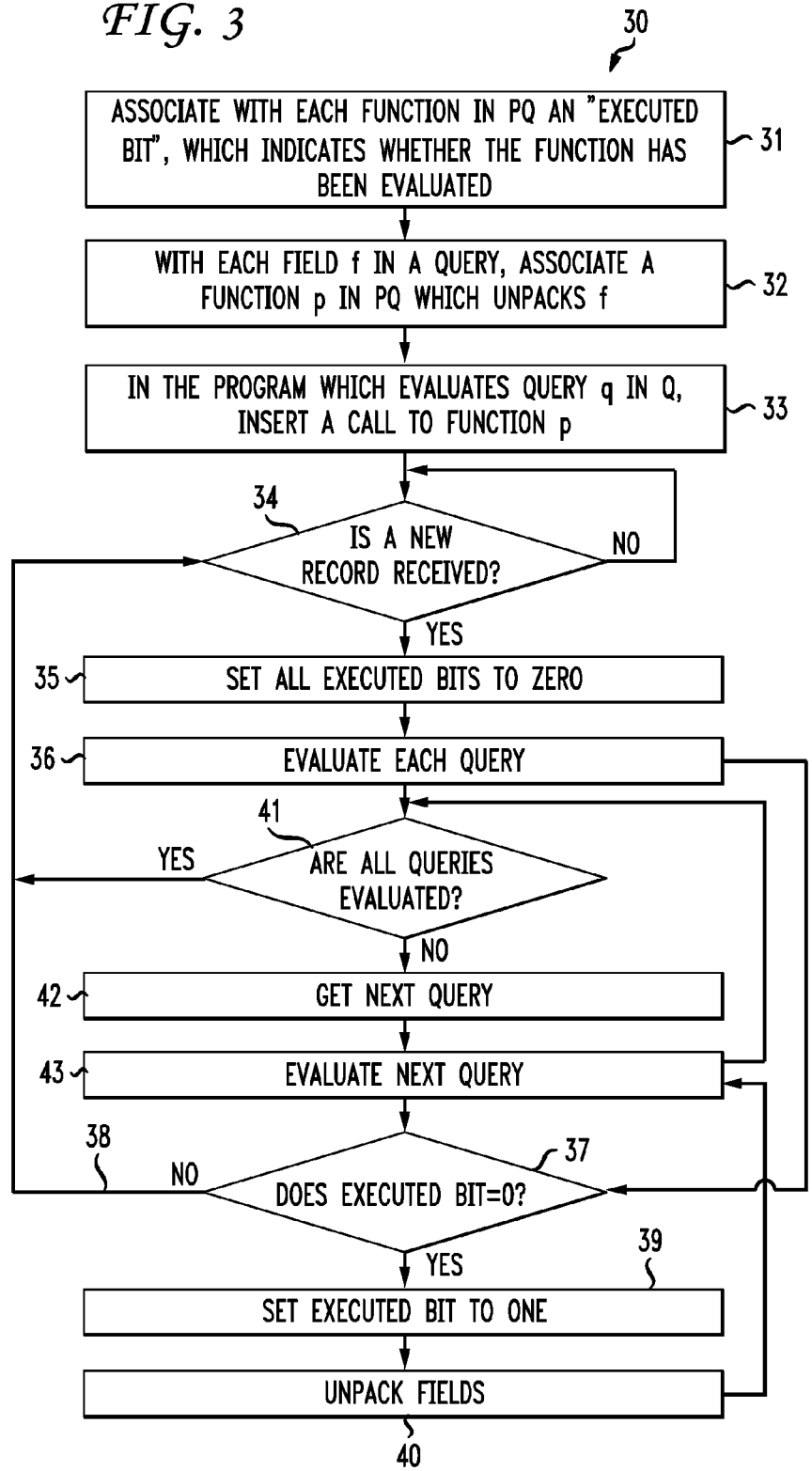

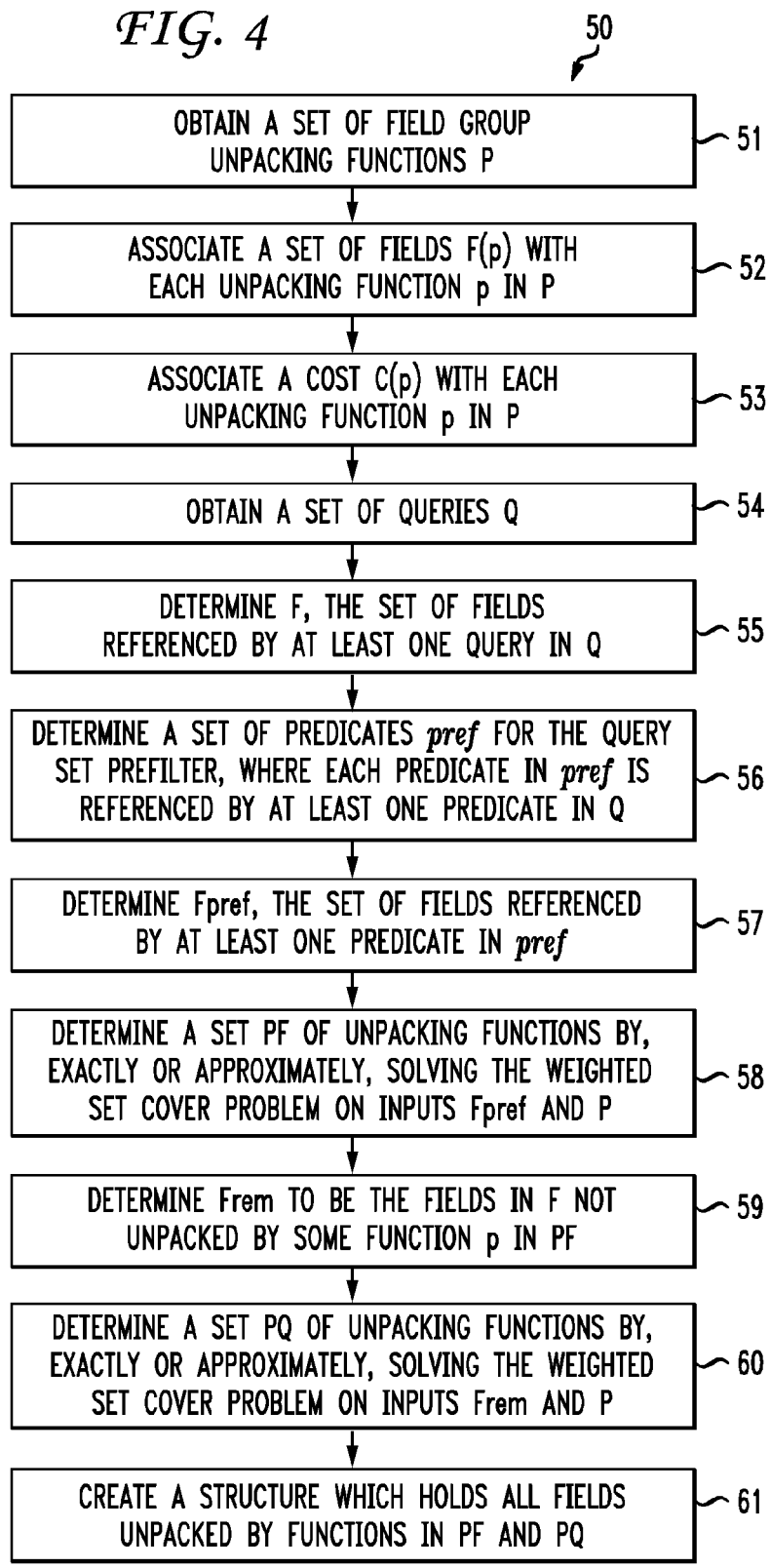

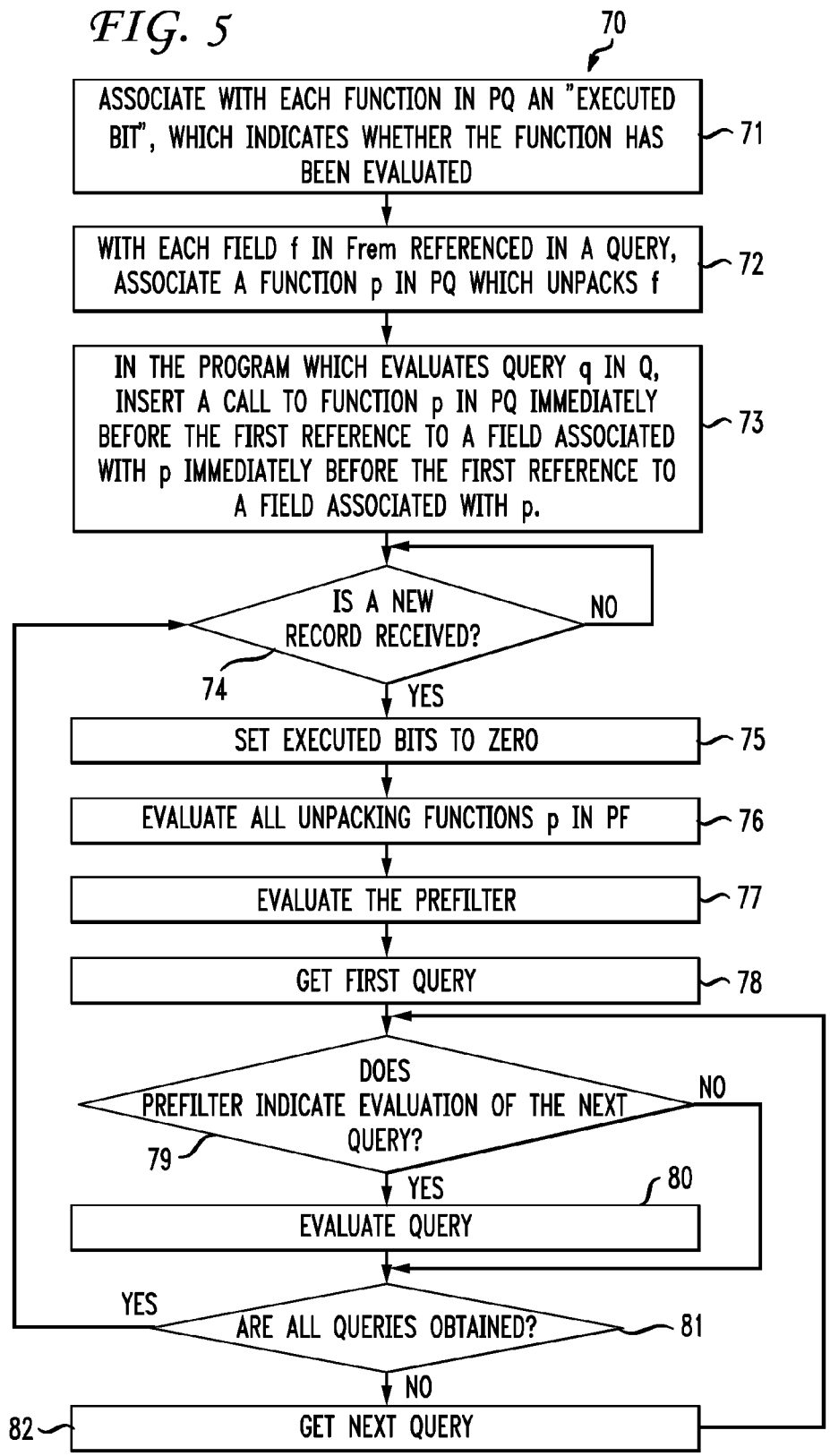

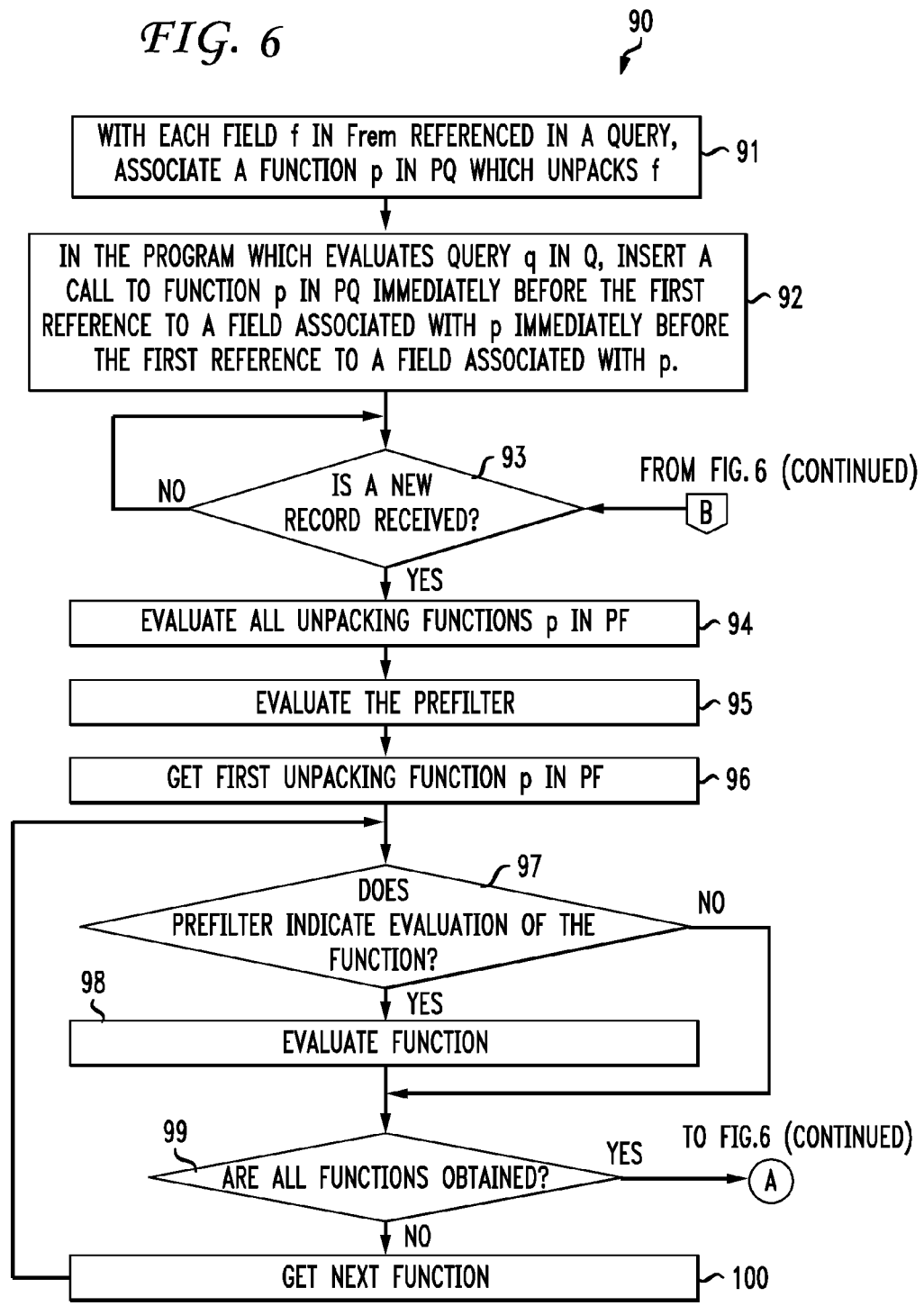

OPTIMIZED FIELD UNPACKING FOR A DATA STREAM MANAGEMENT SYSTEM

BACKGROUND OF THE INVENTION

1. Field of the Invention

The present invention relates to unpacking of data in a data stream management system, and more particularly, to a method for optimizing field unpacking.

2. Brief Description of the Related Art

The present invention relates to obtaining information from a data structure. A data structure includes data streams, databases and any other type of data structure. A stream in a data stream management system includes a collection of packets and a table in a database that includes a collection of records. Each packet or record includes a collection of named fields. For ease of understanding and reading, this application will refer to streams and packets, but such references of streams and packets are not limited to a data stream management system and relate to other types of structures, such as a database.

A task related to the present invention is evaluation of a collection of queries on a stream of data. Each query in the collection of queries references one or more fields from the collection of named fields. The evaluation of each query requires obtaining information contained in the various fields of a data stream, referred to as unpacking the data.

For example, if a query Q1 is "select a and b from S where c=3", then Q1 references the fields of packets of stream S named a, b, and c. Let us suppose further that there is another query, Q2, in the collection of queries to be evaluated over S. Suppose that Q2 is "select c and d where e<7". Then Q2 references the collection of fields c, d, and e. For this example the collection of fields referenced by any query in the collection of queries to be evaluated in S are a, b, c, d, and e. All of the queries in the collection of queries will be evaluated over S at the same time. This will be done one stream at a time. The procedure is presumably to retrieve the next packet of the stream, and then have each query in the collection of queries process the packet.

In general, two evaluations are commonly used to unpack packets of data from a data stream management system, lazy unpacking and eager unpacking. In eager unpacking, after retrieving the next packet from the stream, we prepare it by unpacking the collection of all fields referenced by any query in the collection of queries that we are evaluating over the stream. In the example above, the collection of queries are Q1 and Q2, and the collection of fields are a, b, c, d, and e.

Note that the packets in the stream might have additional fields, for example, f, g, and h. Therefore, in eager unpacking, the procedure is to iterate over all packets in the stream. Upon getting the next packet, fields a, b, c, d, and e are first unpacked, then Q1 is evaluated using the unpacked values of a, b, and c. After that, Q2 is evaluated using the unpacked values c, d, and e.

In lazy unpacking, the unpacking of fields is deferred as late as possible. That means the unpacking occurs on an on-demand basis. The evaluation procedure consists of (1) iterating over the stream, (2) getting the next packet, (3) evaluating Q1 on the packet received, and (4) evaluating Q2 on the packet received. In the example above, Q1 is evaluated as follows: (1) unpack c; (2) if c=3, then first unpack a and second unpack b; and (3) output the packet (a, b). The benefit of lazy unpacking is that if c=4, we do not waste time unpacking fields a and b.

The following is an additional example of lazy unpacking. Suppose there is a packet such that c=3 and e<7. In Q1, a, b, and c will be unpacked. For Q2, the program requires: (1) e to be unpacked; (2) if e<7, then first unpack c and second unpack d; and (3) output the packet (c, d). In this example, if Q1 has already unpacked c, then it wastes time for Q2 to also unpack c. Therefore, in lazy unpacking, we modify our unpacking procedures to test if a field has already been unpacked by another query, and if so use the already unpacked value.

In view of the foregoing, it would be advantageous to provide a method for obtaining specific data, whereby the data is obtained quickly and only requires the necessary fields in the packets to be unpacked.

SUMMARY OF THE INVENTION

The present invention is directed to two methods and a computer-readable medium for obtaining information using field group unpacking functions.

The first method obtains information using field group unpacking functions by identifying at least one optimized unpacking function from a plurality of field group unpacking functions. The optimized unpacking functions are determined by solving a weighted set cover problem using at least one field and a cost, and each field is associated with at least one of the field group unpacking functions. Then, the field is also associated with a query for a set of queries, the cost is associated with the field group unpacking functions, and the optimized unpacking function is used to unpack the field associated with the data stream.

The second method obtains information using field group unpacking functions by identifying at least one optimized unpacking function from a field of group unpacking functions. The optimized unpacking functions are determined by solving a weighted set cover problem using at least one field and a cost, and each field is associated with at least one of the field group unpacking functions. Then, the field is also associated with at least one query, and the cost is associated with the field group unpacking functions.

Next, the prefilter is applied to the data stream by: (1) determining at least one predicate associated at least one query to be used with the prefilter; (2) determining a set of fields associated with the predicate; and (3) determining the prefilter unpacking function by solving the weighted set cover problem using the set of fields referenced by the at least one predicate and the set of field group unpacking functions. After that, a prefilter is associated with a field in the data stream and is unpacked using the prefilter unpacking function. Finally, an optimized field associated with the data stream is unpacked using the optimized unpacking function if the information obtained from the unpacking prefilter field satisfies the predicate.

The computer-readable medium first obtains a field group unpacking functions to execute instructions by at least one computing device. Then the field group unpacking functions are obtained by identifying at least one optimized unpacking function from a plurality of field group unpacking functions. Next, the optimized unpacking function is determined by solving a weighted set cover problem using at least one field and a cost, and each field is associated with one of the field group unpacking functions. Finally, each field is also associated with at least one query for a set of queries, a cost is associated with the field group unpacking functions, and the optimized unpacking functions are associated with the data stream.

Other objects and features of the present invention will become apparent from the following detailed description considered in conjunction with the accompanying drawings.

It is to be understood, however, that the drawings are designed as an illustration only and not as a definition of the limits of the invention.

BRIEF DESCRIPTION OF THE DRAWINGS

FIG. 1 is a flow chart illustrating a method for computing the set of unpacking functions without a prefilter.

FIG. 2 is a flow chart illustrating a method for unpacking functions using an eager evaluation method and no prefilter.

FIG. 3 is a flow chart illustrating a method for unpacking functions using a lazy evaluation method and no prefilter.

FIG. 4 is a flow chart illustrating a method for obtaining two sets of unpacking functions with a prefilter.

FIG. 5 is a flow chart illustrating a method for unpacking functions using the lazy evaluation method and a prefilter.

DETAILED DESCRIPTION OF THE PREFERRED EMBODIMENTS

Figure 6:
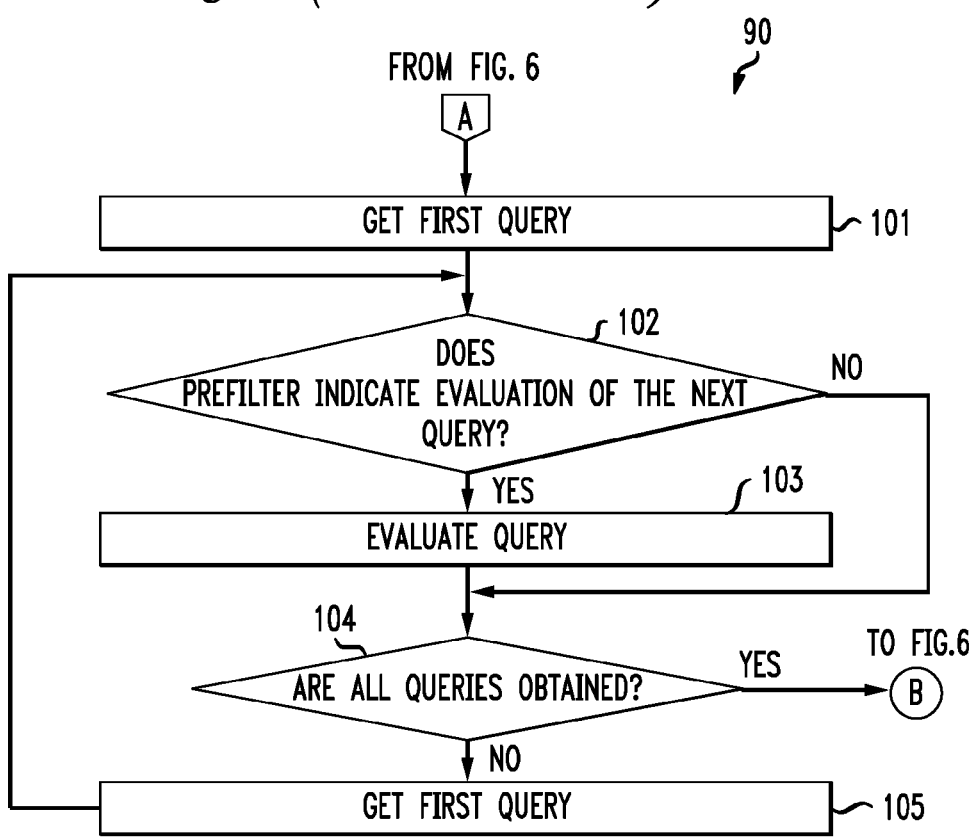
FIG. 6 is a flow chart illustrating a hybrid method of unpacking functions using a prefilter.

The present invention provides a method for optimizing field unpacking for a data stream management system, database, or a similar structure. The embodiments of the present invention use group unpacking functions to optimize the unpacking functions. Optimization of unpacking functions is determined by the minimizing the cost, which is the time it takes to unpack fields of a data stream. Unpacking consists of extracting information from the various fields of a data stream. For example, suppose a query, Q1, requires fields a and b to be unpacked if c=3. Also, suppose it takes 10 ms to unpack field a, 10 ms to unpack field b, and 15 ms to unpack both fields a and b at the same time. Then, since Q1 needs a and b unpacked, when c=3, it would be more efficient to unpack a and b at the same time.

FIG. 1 is a flow chart illustrating the computation of a set of unpacking functions with no prefilter 10. First, a set of field group unpacking functions, P, such that P contains $\{p_1, p_2, p_n\}$ are obtained 11. From that set of field group unpacking functions, P, a set of Fields F(p) are associated with each p in P 12, and a Cost, C(p), is associated with each p in P 13. Next, a set of queries Q are obtained 14.

Then F, the set of fields referenced by at least one query, q, is determined 15. Thereafter, a set PQ of unpacking functions are determined by, exactly or approximately, solving the weighted set cover problem on inputs F and P 16. The weighted set cover problem is solved as follows: (1) assume you are given a set of unpacking functions and a set of fields, (2) the weighted set cover problem determines the different groupings of sets of fields and unpacking functions needed to unpack every packet required for a query; and (3) then, the grouping with the minimum cost is determined. Finally, a structure is created to hold all fields unpacked by functions in PQ 17.

FIG. 2 is a flow chart illustrating a method for unpacking functions using an eager evaluation method with no prefilter 20. This program checks for receipt of a new packet 21. If no new packet is received, then the program continues to check for a new packet 21. When a new packet is received, all functions in PQ are called 22, and then each query is evaluated 23.

FIG. 3 is a flow chart illustrating a method for unpacking functions using a lazy evaluation method with no prefilter 30. First, an executed bit is associated with each function in PQ 31. Executed bits are used to keep track of which functions have been evaluated. Next, a function p in PQ is associated with each field f in a query and the function p in PQ will unpack f 32. Then, the function p is called immediately before the first reference to a field associated with p during the evaluation of query q in Q 33. Finally, each query is evaluated when a new packet is received 34.

The following is the process for evaluating the queries. First, the program checks for a new packet 34. If no new packet is received then the program remains at step 34 checking for new packets. When a new packet is received, all executed bits are set to zero 35. Then, beginning with the first query, all queries are evaluated 36. The queries are evaluated by calling a function p in PQ. If the executed bit for p has a value of one 37, then the value of p is returned 38. When the executed bit for p is zero 37, the executed bit for p is set to one 39, and p is evaluated by unpacking the fields 40.

After the first query is evaluated, the program checks to see if all queries are evaluated by obtaining values for all fields in the data stream needed by the queries 41. If all queries are evaluated then the program goes back to step 34 and looks for a new packet 34. If there are additional queries that need to be evaluated, the next query is obtained 42 and evaluated 43 using steps 37-40. After step 43, the program goes back to step 41, where the program again checks to see if all queries are evaluated 41. Steps 41-43 are repeated until all queries are evaluated. When all queries are evaluated, the program goes to step 34, which checks for new packets.

The following is an example of how the query evaluation occurs. Suppose there are two queries, Q1, and Q2. First, the method evaluates, Q1 36 using steps 37-40. Next, the method checks to see if all queries are evaluated 41. For this example, the result is no, because Q2 needs to be evaluated and steps 42-43, 37-40 are used to evaluate Q2. After Q2 is evaluated, step 41 determines that all queries are evaluated. Finally, the method returns to step 34 to continue looking for new packets.

This method is novel in part because prior methods do not unpack functions using groups of fields. Instead, the prior methods only unpack a single function one field at a time.

FIGS. 4-6 describe methods to optimize field unpacking functions using a prefilter prior to the unpacking method. A prefilter is a function that narrows the number of data streams that need to be unpacked by unpacking predicate fields and performing comparison functions on the predicate fields. Once the predicates are evaluated, the prefilter determines which fields need to be unpacked by excluding from the group the already unpacked predicate fields and streams with packets that are not necessary for the evaluation of the query.

For example, assume the predicate field of a stream S is c>3. The prefilter in this invention will first unpack c and determine if c>3. If c<3 the prefilter indicates that the remaining packets in the stream do not need be unpacked, because they will not be evaluated. If c>3, then the remainder of the necessary packets will be unpacked, but since c was already unpacked and saved, c is excluded from the group of packets being unpacked.

FIG. 4 is a flow chart illustrating a method for obtaining two sets of unpacking functions with a prefilter 50. First, a set of field group unpacking functions, P, such that P contains $\{p_1, p_2, \ldots p_n\}$ are obtained 51. From that set of field group unpacking functions, P, a set of Fields F(p) are associated with each p in P 52, and a Cost, C(p), is associated with each p in P 53. Next, a set of queries Q are obtained 54, such that Q contains $\{Q_1, Q_2, \ldots Q_n\}$. Then F, the set of fields referenced by at least one query Q, is determined 55.

After that, prefiltering occurs. First, a set of predicates pref for the query set prefilter is determined, where each predicate in pref is contained in at least one query in Q 56. Next, the prefilter determines Fpref, which is a set of fields referenced by at least one predicate in pref, is determined 57. Then, a set of unpacking functions, PF, are determined by exactly or approximately solving the weighted set cover problem on inputs Fpref and P 58. Finally, Frem, which is the fields in F not unpacked by some function p in PF, are determined by the prefilter 59.

Thereafter, a set PQ of unpacking functions is determined from the prefilter values by exactly or approximately solving the weighted set cover problem on inputs Frem and P 60. Lastly, a structure is created to hold all fields unpacked by functions in PF and PQ 61.

FIG. 5 is a flow chart illustrating a method for unpacking functions using a lazy evaluation method after a prefilter has been applied 70. First, an executed bit is associated with each field in PQ 71. The executed bits are used to keep track of whether each field was unpacked. Next, a function p in PQ is associated with each field f in Frem in a query, and the function p in PQ will unpack f 72. Then, a function p in PQ is called before the first reference to a field associated with p during the evaluation of query q in Q 73. Finally, when a new record is received, each query is preferably evaluated 74.

The following is the process for evaluating queries when new packets are received. First, the program checks for a new packet 74. If no new packet is received, then the program remains at step 74 and checks for a new packet 74. When a new packet is received, all executed bits are set to zero 75. Next, all unpacking functions p in PF are evaluated 76. After that, the prefilter is evaluated 77. FIG. 4 shows further details concerning prefilters.

Then, the program, beginning with the first query, evaluates all queries 78. After that, the program indicates whether the next query should be evaluated according to the determination of the prefilter 79. For queries that require evaluation, a function p in PQ is called 80. Then, in that same evaluation step: (1) if the executed bit for p has a value 1 then the value of p is returned; (2) when the executed bit for p is zero, the executed bit for p is set to one and p is evaluated by unpacking the fields. This evaluation is similar to the evaluation in FIG. 3 with the addition of the prefilter.

After the first query is evaluated, the program checks to see if all queries are evaluated by obtaining values for all fields in the data stream needed by the queries 81. If all queries are evaluated, then the program goes back to step 74 and looks for a new packet 74. If there are additional queries that need to be evaluated, the query is obtained 82 and evaluated using steps 79-82. Steps 79-82 are repeated until all queries are evaluated. After all queries are evaluated, step 74 is initiated and checks for new packets. The method continues iteratively with step 70.

FIG. 6 is a flow chart illustrating a hybrid method for unpacking functions using a prefilter 90. First, each field f in Frem referenced in a query is associated with a function p in PQ which unpacks f 91. Next, a set of queries that reference p is associated with each function p in PQ 92. Then, the following is done when a new packet is received 93. First, all unpacking functions p in PF are evaluated 94. Second, the prefilter is evaluated 95. Third, for each unpacking function p in PF, p is evaluated if the prefilter indicates that some query that references p will be evaluated 96-100. Fourth, each query is evaluated if the prefilter indicates that the query should be evaluated 101-105.

More specifically, this method determines which p in PQ is evaluated by obtaining the first p in PQ 96, and checking if the prefilter indicates the function will be executed 97. If the prefilter indicates that the function p will be executed, then the function p is evaluated 98 before step 99 is initiated. When the function p is not to be executed, step 98 is skipped and step 99 is initiated. Step 99 checks if all functions p in PQ are obtained by the program. If all functions in PQ are obtained, then step 101 is initiated. If any functions p in PQ remains, the next function is obtained 100, and the function is evaluated according to steps 97-100 until all functions that need to be executed are evaluated.

Once all functions to be executed are evaluated, the queries are evaluated by initially obtaining the first query 101. If the query requires evaluation 102, the evaluation is done in step 103. If no evaluation is required, step 103 is skipped and the method goes directly to step 104.

Step 104 determines if all query values are unpacked. If all queries values are unpacked, the method returns to checking for new packets 93. If there are more queries to obtain, the next query is retrieved in step 105. Once the next query is retrieved, the method goes back to step 102 and repeats steps 102-105 until all required queries are evaluated. After all queries are evaluated, the program returns to step 93 and checks for a new packet.

The advantage of the hybrid evaluation is that all unpacking is done in the prefilter, which eliminates overhead. This means that no lazy evaluation is done and all fields needed during an evaluation will already be unpacked. It is to be noted that the method in accordance with the present invention is efficient because it only unpacks the fields necessary to evaluate the queries.

Examples

The following examples illustrate how each of these evaluations is implemented. Let S be the data stream being queried. S contains at least {a, b, c, d, e}. The set of queries Q contains three queries, {Q1, Q2, Q3}:

Q1: Select a, b from S; where c=0;
Q2: Select b, c from S; where c=1; and
Q2: Select d from S; where e=2

These queries reference the following fields:

Q1 references fields a, b, c;
Q2 references fields b, c, d; and
Q3 references fields d, e.

In these examples, P contains six field group unpacking functions: {p1, p2, p3, p4, p5, p6}. The following defines what each field group unpacks and the cost related to the unpacking.

p1 unpacks a, with an unpacking cost, C(p1)=1;
p2 unpacks b, with an unpacking cost, C(p2)=1;
p3 unpacks c, with an unpacking cost, C(p3)=1;
p4 unpacks d, with an unpacking cost, C(p4)=1;
p5 unpacks e, with an unpacking cost, C(p5)=1; and
p6 unpacks b, c, d, with an unpacking cost, C(p6)=2.

For Examples 1 and 2, PQ is obtained independent of the evaluation as follows. By exactly or approximately solving the weighted set cover problem on inputs of F(p) for P, it is determined that the set of unpacking functions PQ is {p1, p5, p6} has a cost of C(p1, p5, p6)=(1+1+2)=4. After PQ is determined, a structure, such as [int], an integer object in Java, is created to hold the values of the fields a, b, c, d, and e.

In Example 1, an Eager Evaluation is applied when a new packet is received. As a result of the eager evaluation, the program will (1) call functions p1, p5, and p6; and (2) evaluate Q1, Q2, and Q3.

Example 2 uses the same data and applies the Lazy Evaluation. First, the program associates the fields a, b, c, d, and e as follows:

a is associated with p1;
b is associated with p6;
c is associated with p6;

d is associated with p6; and e is associated with p5.

Then, when the program is evaluating the three queries Q1, Q2, and Q3, the program does the following:

For Q1, the program (1) inserts a call to p1 before the first reference to the value of field a; and (2) inserts a call to p6 before the first reference to the value of either field b or c, whichever comes first.

For Q2, the program inserts a call to p6 before the first reference to the value of fields b, c, or d, whichever comes first.

For Q3, the program inserts a call for p6 before the first reference to the value of field d, and a call to p5 before the first reference to the value of field e.

Next, the program creates three executed bits, b1 associated with p1; b2 associated with p2; and b3 associated with p3. When a new packet is received, the program sets the three executed bits b1, b5, and b6 to zero. After that, the program evaluates Q1, Q2, and Q3, which will generate calls to p1, p5, and p6. When p1 is called, the program checks the value of b1. If b1=1 then the value of p1 is returned. Else, b1 is set to one and the rest of the packet in p1 is unpacked. The same process is used to evaluate p5 and p6.

In Example 3, the previous queries and unpacking functions remain the same. The following are found from those values:

The predicates, pref are:

c=0;

c=1; and e=2.

The fields to be unpacked Fpref are c, e.

The unpacking functions in PF are p3, p5.

The fields left unpacked Frem are a, b, d.

The unpacking functions needed to be unpacked PQ are p1, p6.

Next, the program associates a with p1, b with p6, and d with p6; and creates executed bits b1 and b6, similar to that performed in Example 2. Then, the program begins evaluating the Frem functions as follows:

For Q1, the program (1) inserts a call to p1 before the first reference to the value of field a; and (2) inserts a call to p6 before the first reference to the value of field b.

For Q2, the program inserts a call to p6 before the first reference to the value of field b or d, whichever comes first.

For Q3, the program inserts a call for p6 before the first reference to the value of field d.

When a new packet is received, (1) bit counters b3 and b6 are reset to zero; (2) unpacking functions p3 and p5 in PF are evaluated; (3) the prefilter is evaluated; and (4) Q1, Q2, and Q3 are evaluated as indicated by the prefilter. The evaluation of Q1, Q2, and Q3 will generate calls to p1 and p6. When p1 is called, the value of b1 is checked. If b1=1, the value of a from p1 is returned. Otherwise, b1 is set to one and the rest of the unpacking is performed. A call to p6 is evaluated in the same manner as p1.

Example 4 applies the hybrid evaluation with a prefilter using the previous set of queries and unpacking functions. When the hybrid evaluation is used, the program will associate p1 with Q1, and will associate p6 with Q1, Q2, and Q3. Then, the program will evaluate p1, if the prefilter indicates that Q1 should be evaluated. Finally, p6 will be evaluated, if the prefilter indicates that Q1, Q2, and Q3 should be evaluated.

Additional uses for this invention include use in a "multi-query optimization" on either streams in a data stream management system or tables in a database. The invention is also applicable to more than unpacking fields from network packets, as it generally applies to extracting fields from data. Examples of the input forms include CSV text, XML packets, and log packets.

It will be appreciated that the present invention has been described herein with reference to certain preferred or exemplary embodiments. The preferred or exemplary embodiments described herein may be modified, changed, added to or deviated from without departing from the intent, spirit and scope of the present invention. It is intended that all such additions, modifications, amendments, and/or deviations be included within the scope of the claims appended hereto.

What is claimed is:

1. A method of obtaining information using field group unpacking functions comprising:

identifying, by a computer device, at least one optimized unpacking function from a plurality of field group unpacking functions by solving a weighted set cover problem using at least one field and a cost, the at least one field being associated with at least one of the plurality of field group unpacking functions, the at least one field being associated with at least one of a plurality of queries, the cost being associated with the at least one of the plurality of field group unpacking functions;

unpacking, by the computer device, a field associated with a data stream using the at least one optimized unpacking function;

applying, by the computer device, a prefilter to a data stream comprising:

determining, by the computer device, at least one predicate to be used with the prefilter, the predicate being associated with the at least one query;

determining, by the computer device, a plurality of fields associated with the at least one predicate;

determining, by the computer device, at least one prefilter unpacking function by solving the weighted set cover problem using the plurality of fields referenced by the at least one predicate and the plurality of field group unpacking functions; and unpacking, by the computer device, a prefilter field associated with the data stream using the at least one prefilter unpacking function;

unpacking, by the computer device, an optimized field associated with the data stream using the at least one optimized unpacking function based on whether the predicate is satisfied by information obtained from unpacking the prefilter field associated with the data stream using the at least one prefilter unpacking function;

associating, by the computer device, said at least one optimized unpacking function and said at least one query with each optimized field not unpacked by the prefilter unpacking function, but referenced in at least one query;

evaluating, by the computer device, said at least one prefilter unpacking function, and identifying the set of queries remaining that need to be evaluated using said prefilter; and evaluating, by the computer device, said set of queries by using said at least one optimized unpacking function in response to a new packet being received.

2. The method of obtaining information using field group unpacking functions, as defined in claim 1, further comprising exactly or approximately solving the weighted set cover problem.

3. The method of obtaining information using field group unpacking functions, as defined in claim 1, further comprising generating a data structure to hold the field unpacked by the at least one optimized unpacking function.

4. The method of obtaining information using field group unpacking functions, as defined in claim 1, further comprising an eager unpacking method, wherein said eager unpacking method comprises:
   identifying said at least one optimized unpacking function in response to a new packet being received; and
   evaluating said plurality of queries using said at least one optimized unpacking function.

5. The method of obtaining information using field group unpacking functions, as defined in claim 1, further comprising a lazy unpacking method, wherein said lazy unpacking method comprises:
   associating an executed bit with each of said plurality of field group unpacking functions, said executed bit indicating whether a function has been evaluated, said executed bit being set to zero in response to said new packet being received; and
   evaluating said plurality of queries by using said at least one optimized unpacking function before evaluating the field associated with the at least one optimized unpacking function.

6. A non-transitory computer-readable medium comprising instructions, wherein execution of the instructions by at least one computing device obtains information using field group unpacking functions by:
   identifying at least one optimized unpacking function from a plurality of field group unpacking functions by solving a weighted set cover problem using at least one field and a cost, the at least one field being associated with at least one of the plurality of field group unpacking functions, the at least one field being associated with at least one of a plurality of queries, the cost being associated with the at least one of the plurality of field group unpacking functions;
   unpacking a field associated with a data stream using the at least one optimized unpacking function;
   applying a prefilter to a data stream comprising:
      determining at least one predicate to be used with the prefilter, the predicate being associated with the at least one query;
      determining a plurality of fields associated with the at least one predicate;
      determining at least one prefilter unpacking function by solving the weighted set cover problem using the plurality of fields referenced by the at least one predicate and the plurality of field group unpacking functions; and
      unpacking a prefilter field associated with the data stream using the at least one prefilter unpacking function;
      unpacking an optimized field associated with the data stream using the at least one optimized unpacking function based on whether the predicate is satisfied by information obtained from unpacking the prefilter field associated with the data stream using the at least one prefilter unpacking function;
   associating said at least one optimized unpacking function and said at least one query with each optimized field not unpacked by the prefilter unpacking function, but referenced in at least one query;
   evaluating said at least one prefilter unpacking function, and identifying the set of queries remaining that need to be evaluated using said prefilter; and
   evaluating said set of queries by using said at least one optimized unpacking function in response to a new packet being received.

7. The non-transitory computer-readable medium comprising instructions, as defined by claim 6, wherein execution of the instructions by at least one computing device obtains information using field group unpacking functions by exactly or approximately solving the weighted set cover problem.

8. The non-transitory computer-readable medium comprising instructions, as defined by claim 6, wherein execution of the instructions by at least one computing device obtains information using field group unpacking functions by generating a data structure to hold the field unpacked by the at least one optimized unpacking function.

9. The non-transitory computer-readable medium comprising instructions, as defined by claim 6, wherein execution of the instructions by at least one computing device obtains information using field group unpacking functions using an eager unpacking method, wherein said eager unpacking method comprises:
   identifying said at least one optimized unpacking function in response to a new packet being received; and
   evaluating said plurality of queries using said at least one optimized unpacking function.

10. The non-transitory computer-readable medium comprising instructions, as defined by claim 6, wherein execution of the instructions by at least one computing device obtains information using field group unpacking functions using a lazy unpacking method, wherein said lazy unpacking method comprises:
   associating an executed bit with each of said plurality of field group unpacking functions, said executed bit indicating whether a function has been evaluated, said executed bit being set to zero in response to said new packet being received; and
   evaluating said plurality of queries by using said at least one optimized unpacking function before evaluating the field associated with the at least one optimized unpacking function.

* * * * *